United States Patent
Xu et al.

(10) Patent No.: US 11,805,274 B2
(45) Date of Patent: Oct. 31, 2023

(54) EARLY DETERMINATION OF HASH-BASED MOTION SEARCHING

(71) Applicants: Beijing Bytedance Network Technology Co., Ltd., Beijing (CN); Bytedance Inc., Los Angeles, CA (US)

(72) Inventors: Jizheng Xu, San Diego, CA (US); Jiahao Li, Beijing (CN); Weijia Zhu, San Diego, CA (US); Kai Zhang, San Diego, CA (US); Li Zhang, San Diego, CA (US); Hongbin Liu, Beijing (CN); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/360,868

(22) Filed: Jun. 28, 2021

(65) Prior Publication Data
US 2021/0329290 A1 Oct. 21, 2021

Related U.S. Application Data

(63) Continuation of application No. PCT/CN2020/070121, filed on Jan. 2, 2020.

(30) Foreign Application Priority Data

Jan. 2, 2019 (WO) ................ PCT/CN2019/070049
May 22, 2019 (WO) ................ PCT/CN2019/087969

(51) Int. Cl.
*H04N 19/56* (2014.01)
*H04N 19/139* (2014.01)
(Continued)

(52) U.S. Cl.
CPC ........... *H04N 19/56* (2014.11); *H04N 19/105* (2014.11); *H04N 19/137* (2014.11);
(Continued)

(58) Field of Classification Search
CPC .... H04N 19/56; H04N 19/105; H04N 19/137; H04N 19/139; H04N 19/147;
(Continued)

(56) References Cited

U.S. PATENT DOCUMENTS

| | | | |
|---|---|---|---|
| 8,718,140 B1 * | 5/2014 | Cai | H04N 19/119 |
| | | | 375/240.26 |
| 10,136,140 B2 | 11/2018 | Li et al. | |

(Continued)

FOREIGN PATENT DOCUMENTS

| | | |
|---|---|---|
| CN | 105359531 A | 2/2016 |
| CN | 105393537 A | 3/2016 |

(Continued)

OTHER PUBLICATIONS

Bross et al. "Versatile Video Coding (Draft 2), "Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K1001, 2018.

(Continued)

*Primary Examiner* — Richard T Torrente
(74) *Attorney, Agent, or Firm* — Perkins Coie LLP

(57) ABSTRACT

Methods, systems and device for hash-based motion estimation in video coding are described. An exemplary method of video processing includes determining, for a conversion between a current block of a video and a bitstream representation of the video, motion information associated with the current block using a hash-based motion search, a size of the current block being M×N, M and N being positive integers and M being not equal to N, applying, based on the (Continued)

motion information and a video picture comprising the current block, a prediction for the current block, and performing, based on the prediction, the conversion.

21 Claims, 11 Drawing Sheets

(51) Int. Cl.
| | |
|---|---|
| H04N 19/176 | (2014.01) |
| H04N 19/52 | (2014.01) |
| H04N 19/105 | (2014.01) |
| H04N 19/147 | (2014.01) |
| H04N 19/513 | (2014.01) |
| H04N 19/537 | (2014.01) |
| H04N 19/137 | (2014.01) |
| H04N 19/543 | (2014.01) |
| H04N 19/132 | (2014.01) |
| H04N 19/567 | (2014.01) |

(52) U.S. Cl.
CPC ......... *H04N 19/139* (2014.11); *H04N 19/147* (2014.11); *H04N 19/176* (2014.11); *H04N 19/513* (2014.11); *H04N 19/52* (2014.11); *H04N 19/537* (2014.11); *H04N 19/543* (2014.11); *H04N 19/132* (2014.11); *H04N 19/567* (2014.11)

(58) Field of Classification Search
CPC .... H04N 19/176; H04N 19/513; H04N 19/52; H04N 19/537; H04N 19/543; H04N 19/132; H04N 19/567; H04N 19/119; H04N 19/124; H04N 19/186; H04N 19/523; H04N 19/54; H04N 19/557; H04N 19/57; H04N 19/70

See application file for complete search history.

(56) References Cited

U.S. PATENT DOCUMENTS

| | | | |
|---|---|---|---|
| 10,264,290 | B2 | 4/2019 | Xu et al. |
| 10,368,092 | B2 | 7/2019 | Li et al. |
| 10,542,274 | B2 | 1/2020 | Li et al. |
| 10,567,754 | B2 | 2/2020 | Li et al. |
| 10,681,372 | B2 | 6/2020 | Li et al. |
| 11,558,638 | B2 | 1/2023 | Xu et al. |
| 11,616,978 | B2 | 3/2023 | Xu et al. |
| 2013/0129237 | A1 | 5/2013 | Yie et al. |
| 2014/0029666 | A1 | 1/2014 | Sakomizu |
| 2014/0369413 | A1 | 12/2014 | Clark |
| 2015/0373359 | A1 | 12/2015 | He et al. |
| 2016/0100186 | A1 | 4/2016 | Gisquet et al. |
| 2016/0241876 | A1* | 8/2016 | Xu ............ H04N 19/176 |
| 2016/0269732 | A1* | 9/2016 | Li ............ H04N 19/136 |
| 2016/0277733 | A1* | 9/2016 | Li ............ H04N 19/96 |
| 2017/0064301 | A1 | 3/2017 | Ma |
| 2017/0163999 | A1 | 6/2017 | Li et al. |
| 2017/0289566 | A1 | 10/2017 | He et al. |
| 2018/0152699 | A1 | 5/2018 | Kumar et al. |
| 2020/0128266 | A1 | 4/2020 | Xu et al. |
| 2020/0186818 | A1 | 6/2020 | Li et al. |
| 2021/0289201 | A1* | 9/2021 | Bang ............ H04N 19/70 |
| 2021/0329291 | A1 | 10/2021 | Xu et al. |
| 2021/0329293 | A1 | 10/2021 | Xu et al. |

FOREIGN PATENT DOCUMENTS

| | | |
|---|---|---|
| CN | 106105197 A | 11/2016 |
| CN | 108495139 A | 9/2018 |
| WO | 2018102224 A1 | 6/2018 |

OTHER PUBLICATIONS

Li et al. "Hash-Based Motion Search," Joint Collaborative Team on Video Coding (JCT-VC) of ITU-T SG 16 WP 3 and ISO/IEC JTC 1/SC 29/WG 11, 17th Meeting, Valencia, ES, Mar. 27-Apr. 4, 2014, document JCTVC-Q0245, 2014.

Li et al. "Adaptive Motion Vector Resolution for Screen Content," Joint Collaborative Team on Video Coding (JCT-VC) of ITU-T SG 16 WP 3 and ISO/IEC JTC 1/SC 29/WG 11, 19th Meeting Strasbourg, FR, Oct. 17-24, 2014, documenl JCTVC-S0085, 2014.

Xiao et al. "Bottom-Up Hash Value Calculation and Validity Check," Joint Collaborative Team on Video Coding (JCT-VC_ of ITU-T SG 16 WP 3 and ISO/IEC JTC 1/SC 29/WG 11, 23rd Meeting, San Diego, USA, Feb. 19-26, 2016, document JCTVC-W0078, 2016.

Xu et al. "Non-CE8: Hash-Based Motion Search," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0253, 2019.

International Search Report and Written Opinion from International Patent Application No. PCT/CN2020/070120 dated Mar. 23, 2020 (10 pages).

International Search Report and Written Opinion from International Patent Application No. PCT/CN2020/070121 dated Mar. 11, 2020 (9 pages).

International Search Report and Written Opinion from International Patent Application No. PCT/CN2020/070123 dated Apr. 3, 2020 (9 pages).

Non Final Office Action from U.S. Appl. No. 17/360,812 dated May 16, 2022.

Non Final Office Action from U.S. Appl. No. 17/360,902 dated May 16, 2022.

\* cited by examiner

EARLY DETERMINATION OF HASH-BASED MOTION SEARCHING

CROSS-REFERENCE TO RELATED APPLICATIONS

This application is a continuation of International Application No. PCT/CN2020/070121, filed on Jan. 2, 2020, which claims the priority to and benefits of International Patent Application No. PCT/CN2019/070049, filed on Jan. 2, 2019, and International Patent Application No. PCT/CN2019/087969, filed on May 22, 2019. All the aforementioned patent applications are hereby incorporated by reference in their entireties.

TECHNICAL FIELD

This document is related to video and image coding technologies.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, which include hash-based motion estimation, are described. The described methods may be applied to both the existing video coding standards (e.g., High Efficiency Video Coding (HEVC) and/or Versatile Video Coding (VVC)) and future video coding standards or video codecs.

In one representative aspect, the disclosed technology may be used to provide a method for video processing. This method includes determining, for a conversion between a current block of a video and a bitstream representation of the video, motion information associated with the current block using a hash-based motion search, wherein a size of the current block is M×N, wherein M and N are positive integers and M is not equal to N; applying, based on the motion information and a video picture comprising the current block, a prediction for the current block; and performing, based on the prediction, the conversion.

In another representative aspect, the disclosed technology may be used to provide a method for video processing. This method includes determining, for a conversion between a current block of a video and a bitstream representation of the video, motion information associated with the current block using a hash-based motion search on a region of the current block that is non-rectangular and non-square; applying, based on the motion information and a video picture comprising the current block, a prediction for the current block; and performing, based on the prediction, the conversion.

In yet another representative aspect, the disclosed technology may be used to provide a method for video processing. This method includes determining, for a conversion between a current block of a video and a bitstream representation of the video, motion information associated with the current block using a hash-based motion search on a fixed subset of samples of the current block; applying, based on the motion information and a video picture comprising the current block, a prediction for the current block; and performing, based on the prediction, the conversion.

In yet another representative aspect, the disclosed technology may be used to provide a method for video processing. This method includes performing, as part of a conversion between a current block of video and a bitstream representation of the video, a hash-based motion search; determining, based on the hash-based motion search finding a hash match and a quantization parameter (QP) of the reference frame being not larger than a QP of the current block, a rate-distortion cost of a prediction by skipping a rate-distortion cost calculation for each of one or more coding modes of the current block for the conversion; applying, based on the rate-distortion cost and a video picture comprising the current block, a prediction for the current block; and performing, based on the prediction, the conversion.

In yet another representative aspect, the disclosed technology may be used to provide a method for video processing. This method includes determining, for a conversion between a current block of a video and a bitstream representation of the video, motion information associated with the current block using a hash-based motion search that is based on hash values of square sub-blocks of the current block, wherein a size of the current block is M×N, and wherein M and N are positive integers; applying, based on the motion information and a video picture comprising the current block, a prediction for the current block; and performing, based on the prediction, the conversion.

In yet another representative aspect, the disclosed technology may be used to provide a method for video processing. This method includes determining, for a conversion between a current block of a video and a bitstream representation of the video, motion information associated with the current block using a hash-based motion search that includes performing a K-pel integer motion vector (MV) precision check for the hash-based motion search, wherein K is a positive integer; applying, based on the motion information and a video picture comprising the current block, a prediction for the current block; and performing, based on the prediction, the conversion.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

DETAILED DESCRIPTION

The present document provides various techniques that can be used by a decoder of image or video bitstreams to improve the quality of decompressed or decoded digital video or images. For brevity, the term "video" is used herein to include both a sequence of pictures (traditionally called video) and individual images. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. Summary

This invention is related to video coding technologies. Specifically, it is related to motion estimation in video coding. It may be applied to the existing video coding standard like HEVC, or the standard (Versatile Video Coding) to be finalized. It may be also applicable to future video coding standards or video codec.

2. Background

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM) [2][3]. In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 2) could be found at:

http://phenix.it-sudparis.eu/jvet/doc_end_user/documents/11_Ljubljana/wg11/JVET-K1001-v7.zip The latest reference software of VVC, named VTM, could be found at:

https://vcgit.hhi.fraunhofer.de/jvet/VVCSoftware_VTM/tags/VTM-2.1

Figure 5:
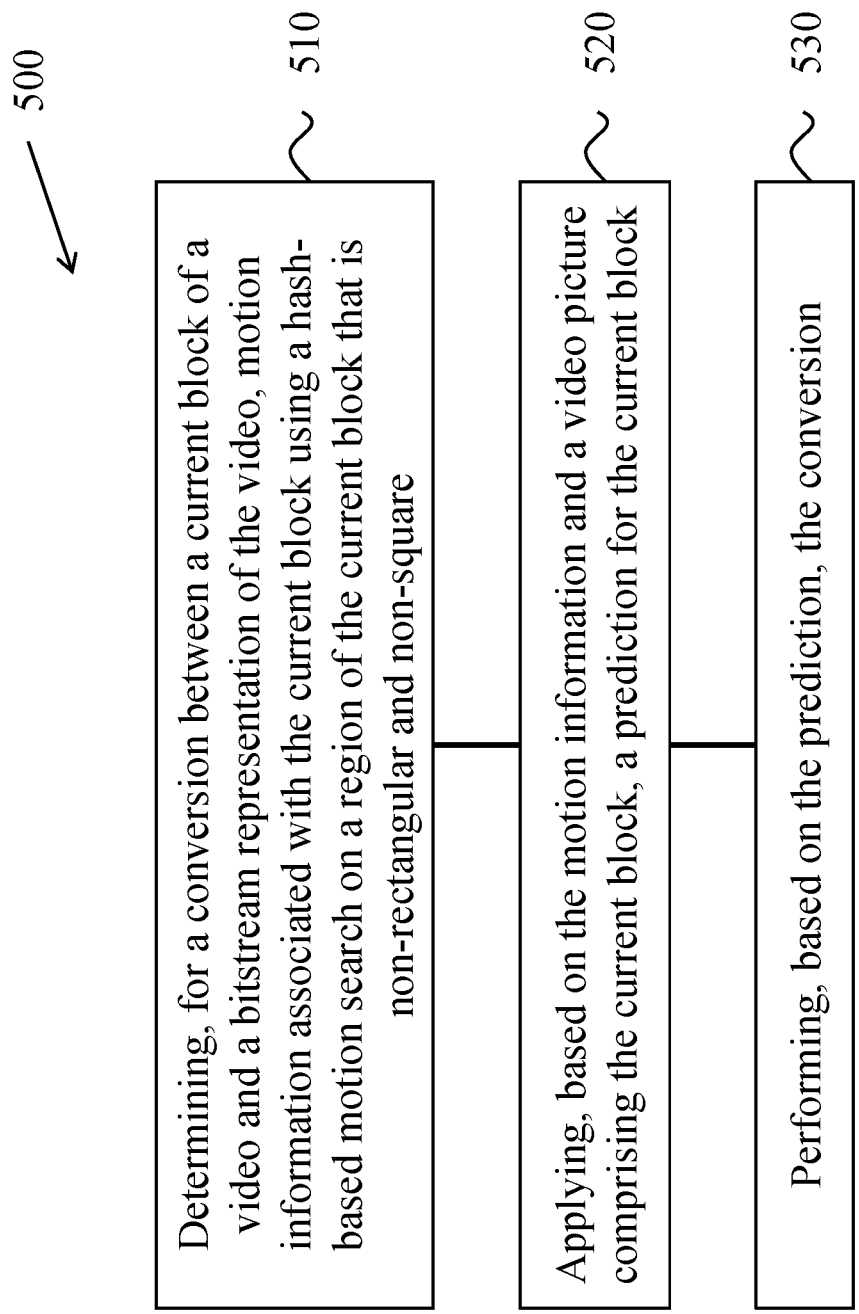

FIG. 5 is a block diagram of an example implementation of a video encoder. FIG. 5 shows that the encoder implementation has a feedback path built in in which the video encoder also performs video decoding functionality (reconstructing compressed representation of video data for use in encoding of next video data).

2.1 Examples of Hash-Based Motion Search

Hash-based search is applied to 2N×2N block. 18-bit hash based on original pixels are used. The first 2 bits are determined by the block size, e.g. 00 for 8×8, 01 for 16×16, 10 for 32×32, and 11 for 64×64. The following 16 bits are determined by the original pixels.

For one block, we calculate two hash values using the similar way but different CRC truncated polynomial. The first hash value is used for retrieval and the second hash value is used to exclude some of the hash conflicts. The hash value is calculated as follows:

For each row, calculate the 16-bit CRC value for all the pixels Hash[i].

Group the row hash values together (Hash[0]Hash[1] . . . ) and then calculate the 24-bit CRC value H.

The lower 16 bits of H will be used as the lower 16 bits of hash value of the current block.

To avoid one hash value corresponds to too many entries, we avoid to add the blocks satisfying following conditions into the hash table There is only one pixel value in every row; or There is only one pixel value in every column.

Because for this kind of blocks, the block with shifting one pixel may have the same content. So, we exclude these blocks from hash table. And this kind of blocks may be predicted perfectly by horizontal prediction or vertical prediction, so excluding them from hash table may not lead to significant performance drop.

After building the hash table, the motion search is performed as follows.

For 2N×2N block,

Perform hash based search first.

If hash match is found, skip the normal integer pixel motion search and fraction pixel motion search. Otherwise, perform normal motion search.

Save the integer MV found for 2N×2N block.

For non-2N×2N block, compare the cost of using MVP as ME start point and using the stored MV of 2N×2N block using the same reference picture. And then select the one with smaller cost as the motion search start point.

We also developed early termination algorithm based on hash search, if all the following conditions are satisfied, the RDO process will be terminated, without checking other modes and CU splitting.

Hash match is found.

The quality of the reference block is no worse than the expected quality of the current block (the QP of the reference block is no greater than the QP of the current block).

Current CU depth is 0.

2.2 Additional Examples of Hash-Based Motion Search

1. Bottom-Up Hash Value Calculation

To speed up the hash value calculation, we propose to calculate the block hash value in a bottom-up manner. Same as the implementation in [1], the two hash values are calculated using the similar way but different CRC truncated polynomial. And the CRC truncated polynomial used is same as in current SCM.

Figure 1:
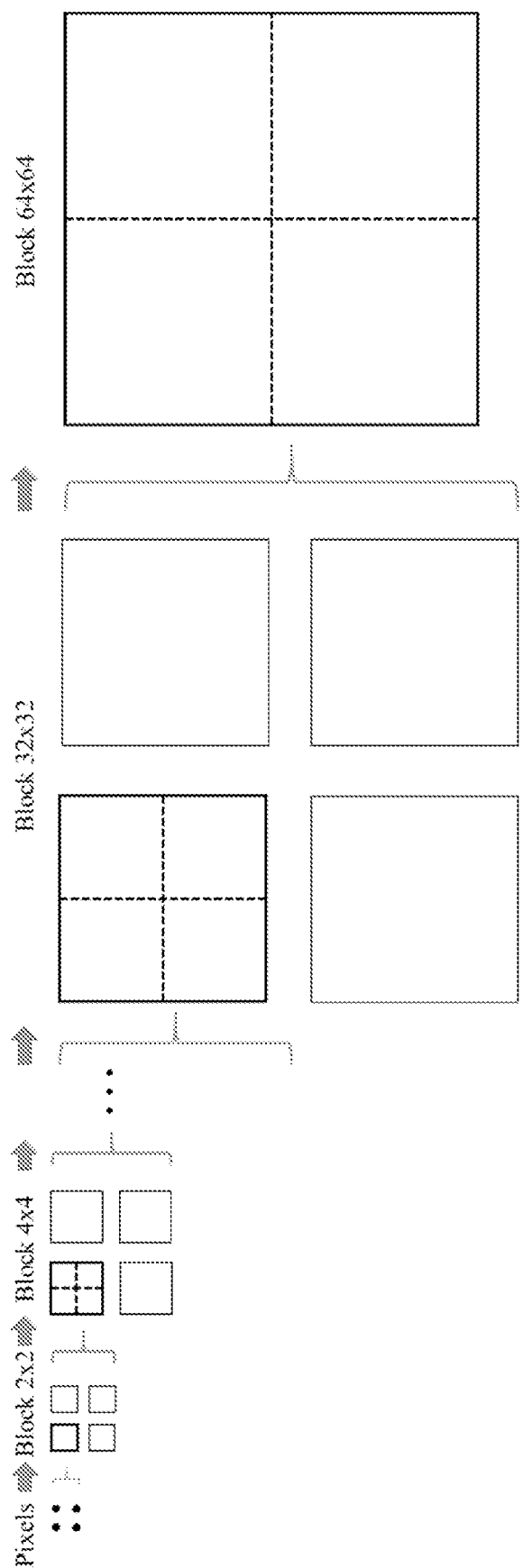
FIG. 1 shows an example of bottom-up hash calculation.

For one 2N×2N (N=2, 4, 8, 16 or 32) block, the hash value is calculated based on its four sub N×N block hash results instead of the pixels, which can make use of the intermediate data (smaller block hash value results) as much as possible to decrease the complexity. As for N=1, i.e. 2×2 block, the block hash value is calculated directly from the pixels. The whole process is shown in FIG. 1.

2. Bottom-Up Validity Check for the Process of Block Adding to Hash Table

In the proposed scheme, the conditions to judge if it one block is valid to adding to hash table are not changed. The only change is the step to check if one block is valid. Similar to the block hash value calculation, the validity check can also be performed in a bottom-up manner to reuse intermediate result and decrease complexity.

For all 2×2 blocks in the picture, the row/column same check is done based on pixels. The row/column same decision results are stored for 4×4 block validity check. For one 2N×2N (N=2, 4, 8, 16 or 32) block, the validity can be simply decided by the row/column same information of 6 sub N×N block for each direction, respectively.

Figure 2B:
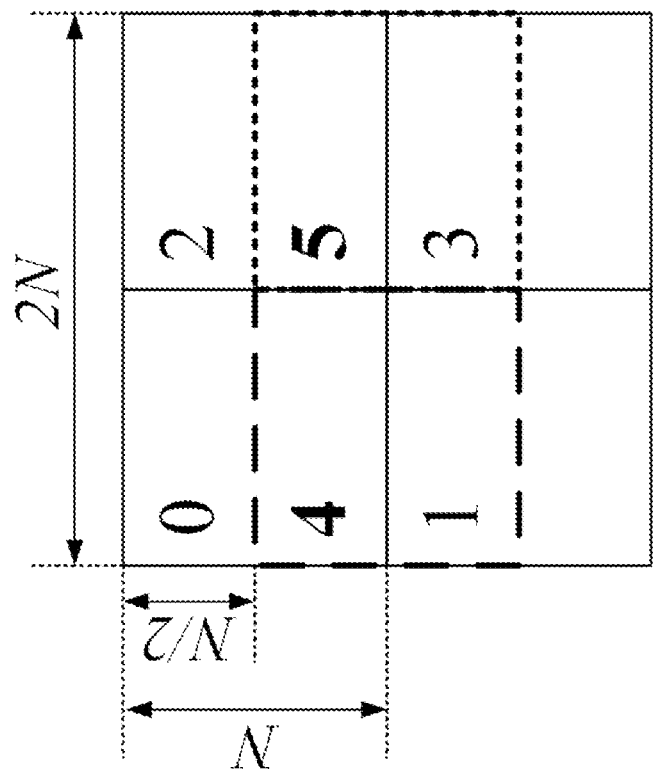
FIG. 2A and FIG. 2B shows an example of a 2N×2N block row/column same information check based on the results of six N×N blocks.
Figure 2A:
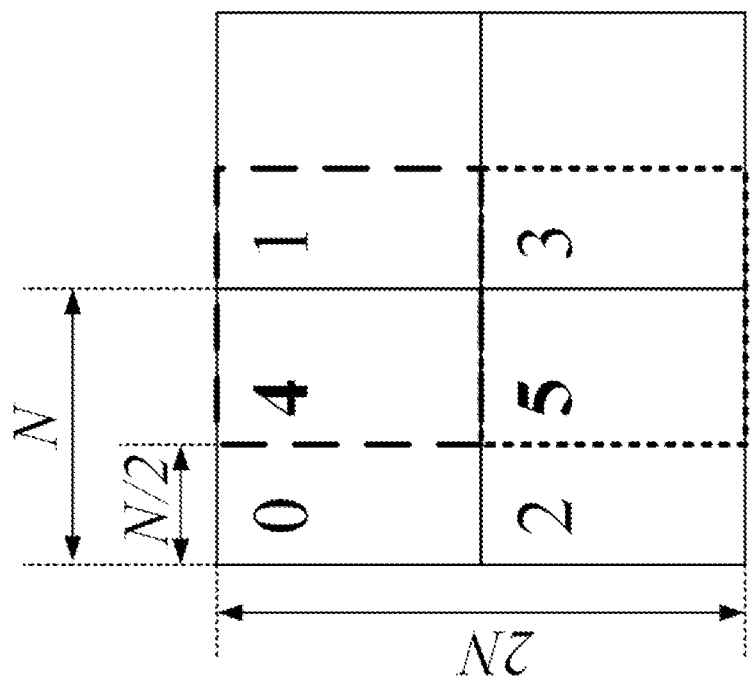

Take row same checking as an example. The four sub N×N block is marked as 0-3 in FIG. 2 (*a*). Besides, to check whether the boundary pixels between block 0 and 1, and block 2 and 3, are the same, the row same information should be used for the middle N×N block 4 and block 5 for the top half and bottom half block, respectively. In other words, the 2N×2N block row same information can be decided by the row same information of the 6 sub N×N blocks, which is already recorded in the previous step. In this way, repeated check on the pixels for different size of blocks can be avoided.

2.3 Current Picture Referencing

Figure 3:
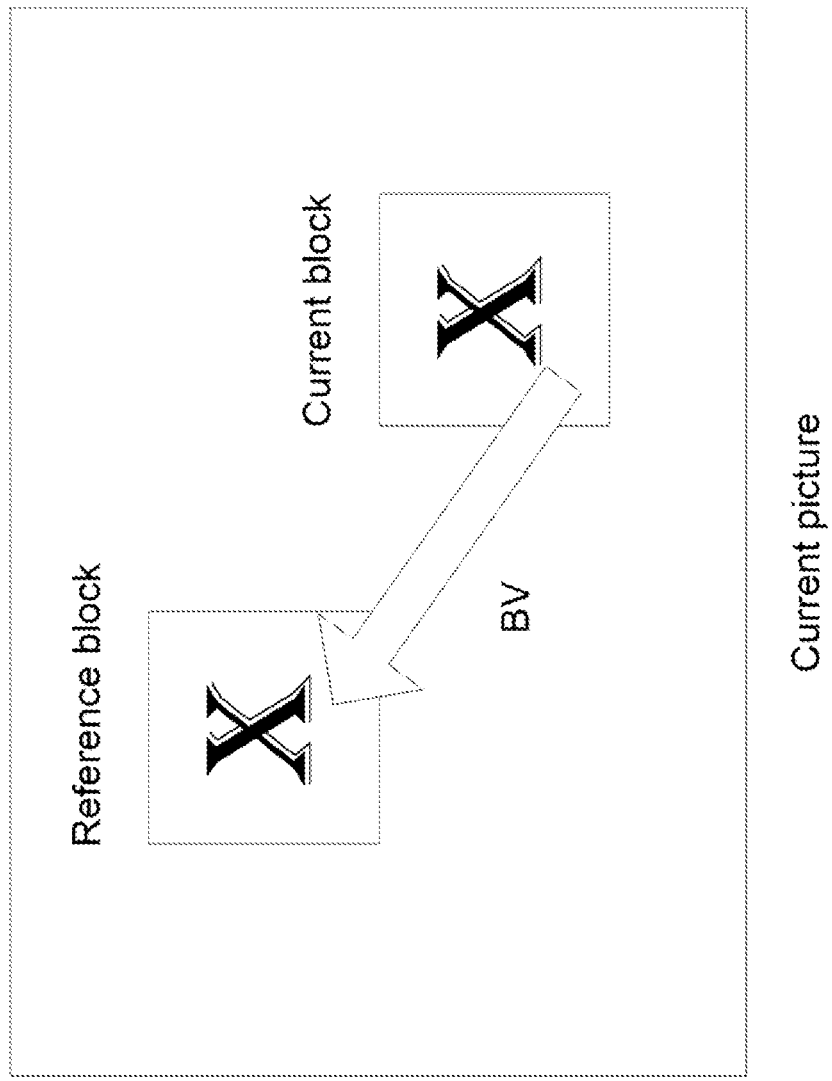
FIG. 3 shows an example of current picture referencing.

Current Picture Referencing (CPR), or once named as Intra Block Copy (IBC) has been adopted in HEVC Screen Content Coding extensions (HEVC-SCC) [1] and the current VVC test model (VTM-3.0) [2]. IBC extends the concept of motion compensation from inter-frame coding to intra-frame coding. As demonstrated in FIG. 3, the current block is predicted by a reference block in the same picture when CPR is applied. The samples in the reference block must have been already reconstructed before the current block is coded or decoded. Although CPR is not so efficient for most camera-captured sequences, it shows significant coding gains for screen content. The reason is that there are lots of repeating patterns, such as icons and text characters in a screen content picture. CPR can remove the redundancy between these repeating patterns effectively. In HEVC-SCC, an inter-coded coding unit (CU) can apply CPR if it chooses the current picture as its reference picture. The MV is renamed as block vector (BV) in this case, and a BV always has an integer-pixel precision. To be compatible with main profile HEVC, the current picture is marked as a "long-term" reference picture in the Decoded Picture Buffer (DPB). It should be noted that similarly, in multiple view/3D video coding standards, the inter-view reference picture is also marked as a "long-term" reference picture.

Following a BV to find its reference block, the prediction can be generated by copying the reference block. The residual can be got by subtracting the reference pixels from the original signals. Then transform and quantization can be applied as in other coding modes.

However, when a reference block is outside of the picture, or overlaps with the current block, or outside of the reconstructed area, or outside of the valid area restricted by some constrains, part or all pixel values are not defined. Basically, there are two solutions to handle such a problem. One is to disallow such a situation, e.g. in bitstream conformance. The other is to apply padding for those undefined pixel values. The following sub-sessions describe the solutions in detail.

2.4 Hash-Based Search for Intra Block Copy/Current Picture Referencing

Hash-based search is applied to 4×4, 8×8 and 16×16 blocks. For one block, we calculate two hash values using the similar way but different CRC truncated polynomial. The first hash value is used for retrieval and the second hash value is used to exclude some of the hash conflicts. The hash value is calculated as follows:

For each row, calculate the 16-bit CRC value for all the pixels Hash[i].

Group the row hash values together (Hash[0]Hash[1] . . . ) and then calculate the 24-bit CRC value H.

The lower 16 bits of H will be used as the lower 16 bits of hash value of the current block.

To avoid one hash value corresponds to too many entries, we avoid to add the blocks satisfying following conditions into the hash table There is only one pixel value in every row. Or There is only one pixel value in every column.

Because for this kind of blocks, the block with shifting one pixel may have the same content. So, we exclude these blocks from hash table. And this kind of blocks may be predicted perfectly by horizontal prediction or vertical prediction.

3. Drawbacks of Existing Implementations

The current hash-based search is limited to N×N (square) blocks, which restricts its performance.

4. Examples of Embodiments

The detailed techniques below should be considered as examples to explain general concepts. These techniques should not be interpreted in a narrow way. Furthermore, these techniques can be combined in any manner.

1. It is proposed that hash-based motion search can be based on block with M×N size with M unequal to N.
   a. In one example, M=2N, 4N, 8N, 16N or 32N.
   b. In one example, N=2M, 4M, 8M, 16M or 32M.
   c. The hash values of non-square blocks may be derived from hash values of square blocks.
   d. In one example, if M is larger than N, the M×N block's hash value may be derived from M/N (N, N) blocks' hash values.
   e. Alternatively, if M is smaller than N, the M×N block's hash value may be derived from N/M (M, M) blocks' hash values.
2. It is proposed that hash-based motion search can be based on a triangular region.
   a. In one example, the region is defined as x<ky; x, y=0, 1, 2, . . . M−1, where x, y are relative coordinates to the start point of the block and k is a predefined value.
   b. Alternatively, the region is defined as x>ky, x, y=0, 1, 2, . . . M−1
   c. Alternatively, the region is defined as x<M−ky, x, y=0, 1, 2, . . . M−1
   d. Alternatively, the region is defined as x>M−ky, x, y=0, 1, 2, . . . M−1
3. It is proposed that hash-based motion search can be based on a fixed subset of a block.
   a. In one example, the subset is defined as a set of predefined coordinates relative to the start point of the block.

4. Hash-based motion vector may be added as an additional starting point during the MV estimation process.
   a. In the integral motion estimation (e.g. xTZSearch or xTZSearchSelective), the hash-based motion vector is checked for the best start point initialization.
   b. If the hash-based motion vector exists, the fractional motion estimation may be skipped.
5. Early termination
   a. When hash match is found and the quantization parameter of reference frame is not larger than that of current block, only skip checking the rate-distortion costs of for ETM_MERGE_SKIP, ETM_AFFINE, ETM_MERGE_TRIANGLE modes.
      i. Alternatively, furthermore, checking rate-distortion costs of other modes, e.g., AMVP, are skipped.
      11. Alternatively, furthermore, the finer-grained block partition checking is terminated.
      iii. Alternatively, furthermore, if the best mode is ETM_HASH_INTER after checking those skip modes, the finer-grained block partition checking may be terminated. Otherwise, the finer-grained block partition checking may be not terminated.
   b. In one example, when hash match is found and the quantization parameter of reference frame is not larger than that of current block, only skip checking the rate-distortion costs for ETM_MERGE_SKIP, ETM_AFFINE, ETM_MERGE_TRIANGLE modes, and the ETM_INTER_ME (e.g., AMVR) mode.
      i. Alternatively, furthermore, checking rate-distortion costs of other modes, e.g., ETM_INTRA, are skipped.
      ii. Alternatively, furthermore, the finer-grained block partition checking is terminated.
   c. Whether to apply above methods may depend on the block's dimension.
      i. In one example, it may be invoked only when the block size is larger than or equal to M×N.
      ii. In one example, it may be invoked only when block size is equal to 64×64.
6. It is proposed to check hash mode of rectangle block by its sub-square hash values.
   a. In one example, such method may be also applicable to square blocks.
7. It is proposed to add K-pel integer MV precision check for hash MV
   a. In one example, K is set to 4.
8. The above methods may be applied to partial of allowed block sizes.
   a. In one example, for the square blocks, hash-base method may be applied to N×N blocks with N smaller than or equal to a threshold (e.g., 64).
   b. In one example, for the non-square (rectangular) blocks, hash-base method may be applied to M×N blocks with M*N smaller than or equal to a threshold (e.g., 64).
   c. In one example, for the non-square (rectangular) blocks, hash-based method may be only applied to 4×8, 8×4.
   d. The above methods may be applied to only certain color component, such as the luma color component, the base color component (e.g., G).

Figure 4:
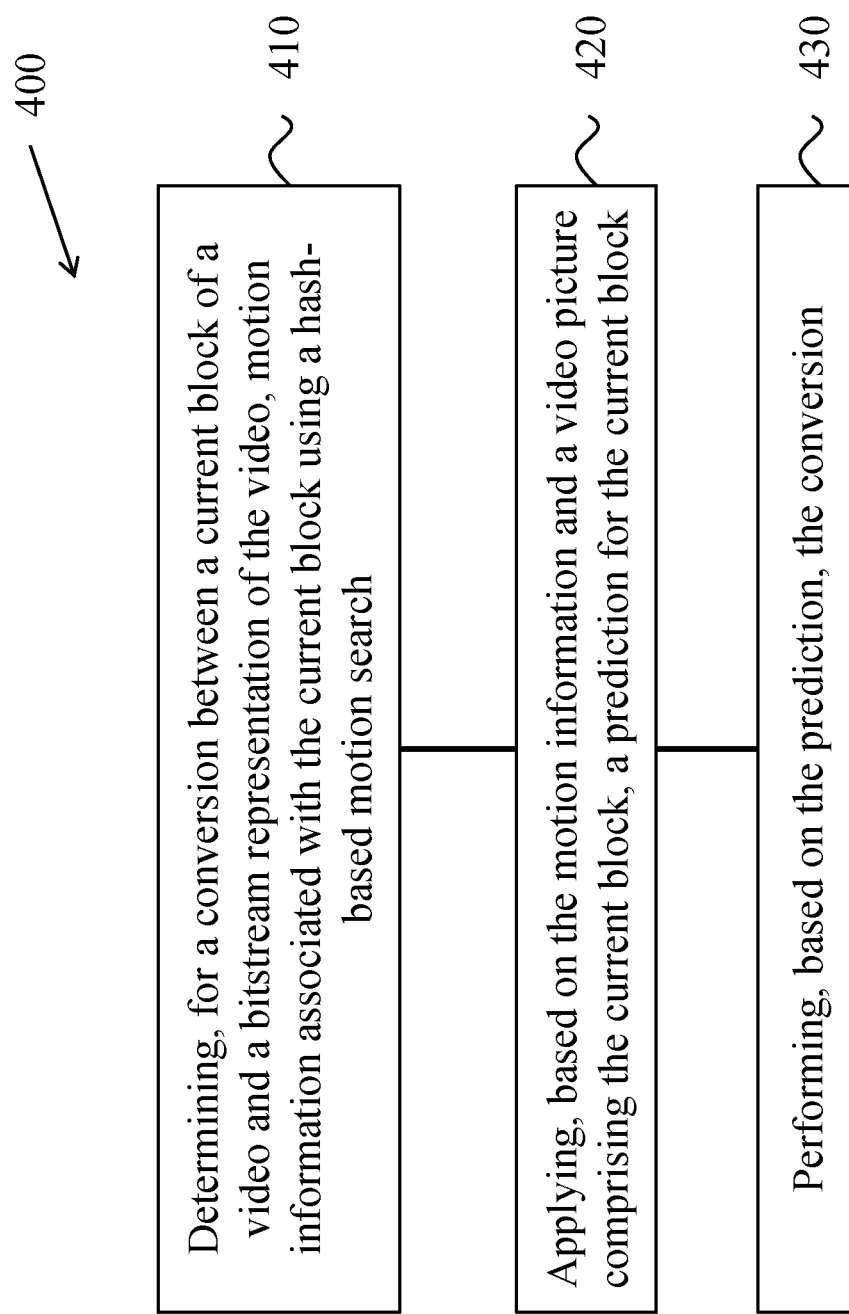
FIGS. 4-9 are flowcharts for examples of video processing methods.

FIG. 4 is a flowchart for a method 400 of video processing. The method 400 includes, at operation 410, determining, for a conversion between a current block of a video and a bitstream representation of the video, motion information associated with the current block using a hash-based motion search, wherein a size of the current block is M×N, wherein M and N are positive integers and M is not equal to N.

The method 400 includes, at operation 420, applying, based on the motion information and a video picture comprising the current block, a prediction for the current block.

The method 400 includes, at operation 430, performing, based on the prediction, the conversion.

FIG. 5 is a flowchart for a method 500 of video processing. The method 500 includes, at operation 510, determining, for a conversion between a current block of a video and a bitstream representation of the video, motion information associated with the current block using a hash-based motion search on a region of the current block that is non-rectangular and non-square.

The method 500 includes, at operation 520, applying, based on the motion information and a video picture comprising the current block, a prediction for the current block.

The method 500 includes, at operation 530, performing, based on the prediction, the conversion.

Figure 6:
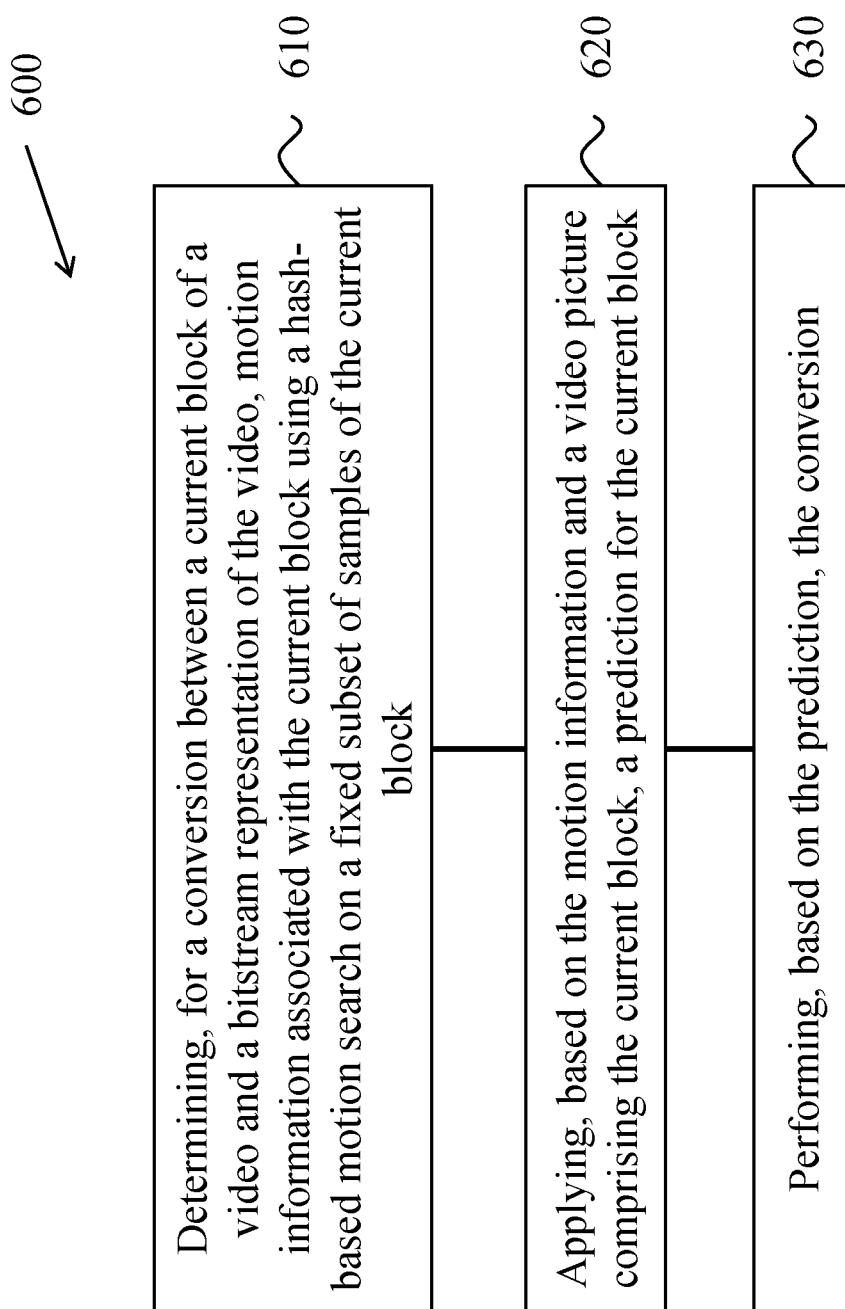

FIG. 6 is a flowchart for a method 600 of video processing. The method 600 includes, at operation 610, determining, for a conversion between a current block of a video and a bitstream representation of the video, motion information associated with the current block using a hash-based motion search on a fixed subset of samples of the current block.

The method 600 includes, at operation 620, applying, based on the motion information and a video picture comprising the current block, a prediction for the current block.

The method 600 includes, at operation 630, performing, based on the prediction, the conversion.

Figure 7:
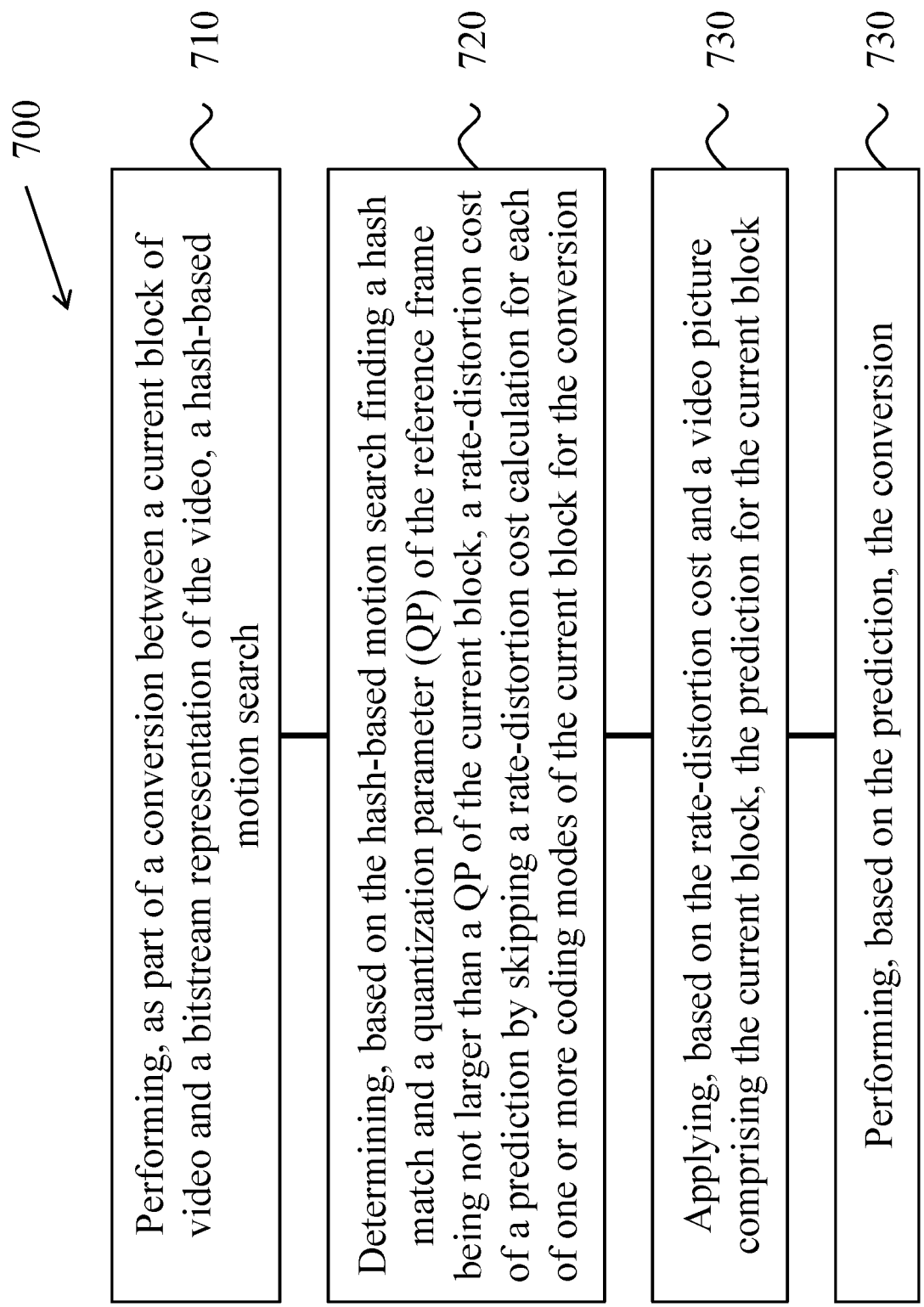

FIG. 7 is a flowchart for a method 700 of video processing. The method 700 includes, at operation 710, performing, as part of a conversion between a current block of video and a bitstream representation of the video, a hash-based motion search.

The method 700 includes, at operation 720, determining, based on the hash-based motion search finding a hash match and a quantization parameter (QP) of the reference frame being not larger than a QP of the current block, a rate-distortion cost of a prediction by skipping a rate-distortion cost calculation for each of one or more coding modes of the current block for the conversion.

The method 700 includes, at operation 730, applying, based on the rate-distortion cost and a video picture comprising the current block, a prediction for the current block.

The method 700 includes, at operation 740, performing, based on the prediction, the conversion.

Figure 8:
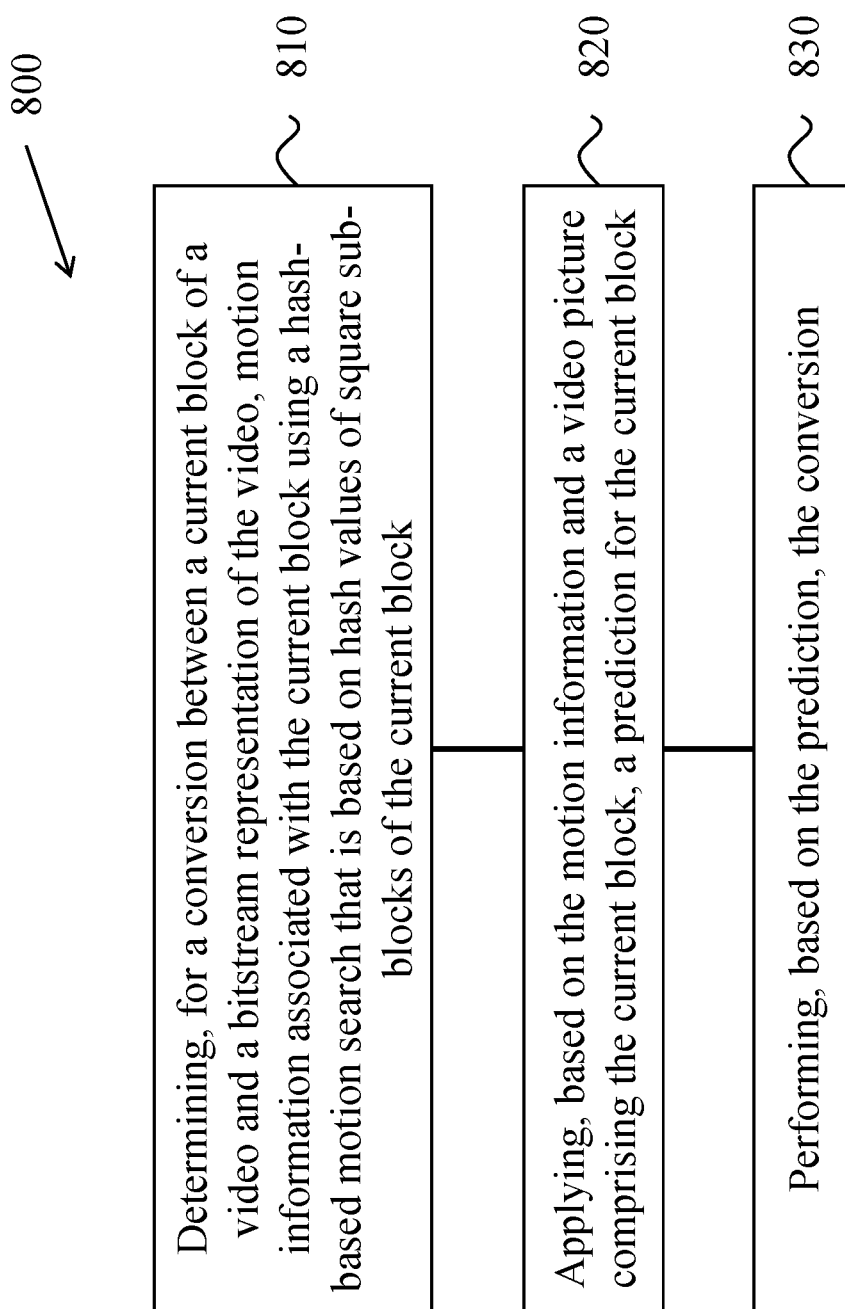

FIG. 8 is a flowchart for a method 800 of video processing. The method 800 includes, at operation 810, determining, for a conversion between a current block of a video and a bitstream representation of the video, motion information associated with the current block using a hash-based motion search that is based on hash values of square sub-blocks of the current block, wherein a size of the current block is M×N, and wherein M and N are positive integers.

The method 800 includes, at operation 820, applying, based on the motion information and a video picture comprising the current block, a prediction for the current block.

The method 800 includes, at operation 830, performing, based on the prediction, the conversion.

Figure 9:
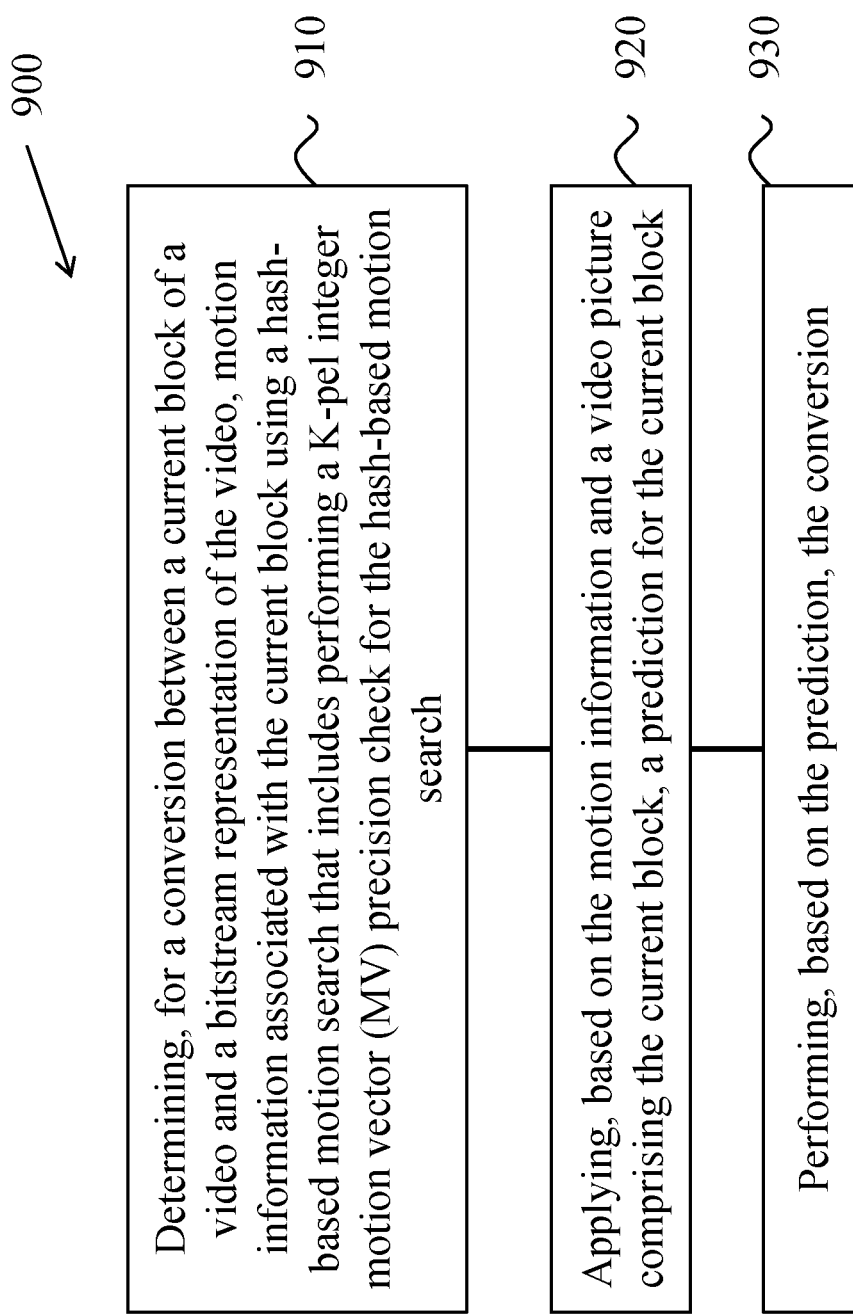

FIG. 9 is a flowchart for a method 900 of video processing. The method 900 includes, at operation 910, determining, for a conversion between a current block of a video and a bitstream representation of the video, motion information associated with the current block using a hash-based motion search that includes performing a K-pel integer motion vector (MV) precision check for the hash-based motion search, wherein K is a positive integer.

The method 900 includes, at operation 920, applying, based on the motion information and a video picture comprising the current block, a prediction for the current block.

The method 900 includes, at operation 930, performing, based on the prediction, the conversion.

In some embodiments, the following technical solutions can be implemented:

A1. A method of video processing, comprising: determining, for a conversion between a current block of a video and a bitstream representation of the video, motion information associated with the current block using a hash-based motion search, wherein a size of the current block is M×N, wherein M and N are positive integers and M is not equal to N; applying, based on the motion information and a video picture comprising the current block, a prediction block for the current block; and performing, based on the prediction block, the conversion.

A2. The method of solution A1, wherein M=K×N, and wherein K is a positive integer.

A3. The method of solution A1, wherein N=K×M, and wherein K is a positive integer.

A4. The method of solution A2 or A3, wherein K=2, 4, 8, 16 or 32.

A5. The method of solution A1, wherein deriving a hash value for the current block is based on a hash value of a square block of the video.

A6. The method of solution A5, wherein deriving a hash value for the current block is based on hash values of M/N blocks of size N×N that form the current block due to a determination that M is larger than N.

A7. The method of solution A5, wherein deriving a hash value for the current block is based on hash values of N/M blocks of size M×M that form the current block due to a determination that N is larger than M.

A8. A method of video processing, comprising: determining, for a conversion between a current block of a video and a bitstream representation of the video, motion information associated with the current block using a hash-based motion search on a region of the current block that is non-rectangular and non-square; applying, based on the motion information and a video picture comprising the current block, a prediction block for the current block; and performing, based on the prediction block, the conversion.

A9. The method of solution A8, wherein the region comprises a triangular region comprising samples with coordinates (x,y), wherein x and y are relative to a start point of the current block, wherein a size of the current block is M×N, and wherein M and N are positive integers.

A10. The method of solution A9, wherein x<k×y, k is a predefined value and y=0, 1, . . . , M−1.

A11. The method of solution A9, wherein x>k×y, k is a predefined value and y=0, 1, . . . , M−1.

A12. The method of solution A9, wherein x<(M−k×y), k is a predefined value and y=0, 1, . . . , M−1.

A13. The method of solution A9, wherein x>(M−k×y), k is a predefined value and y=0, 1, . . . , M−1.

A14. A method of video processing, comprising: determining, for a conversion between a current block of a video and a bitstream representation of the video, motion information associated with the current block using a hash-based motion search on a fixed subset of samples of the current block; applying, based on the motion information and a video picture comprising the current block, a prediction block for the current block; and performing, based on the prediction block, the conversion.

A15. The method of solution A14, wherein the fixed subset of samples comprise a set of predefined coordinates relatives to a start point of the current block.

A16. The method of any of solutions A1 to A15, wherein the hash-based motion search includes adding a hash-based motion vector (MV) as a starting point during a MV estimation technique.

A17. The method of solution A16, wherein the hash-based MV is checked for a best start point initialization in an integral motion estimation.

A18. The method of solution A16 or A17, wherein a fractional motion estimation operation is skipped due to a determination that the hash-based MV exists.

A19. The method of any of solutions A1 to A18, wherein the conversion generates the current block from the bitstream representation.

A20. The method of any of solutions A1 to A18, wherein the conversion generates the bitstream representation from the current block.

A21. An apparatus in a video system comprising a processor and a non-transitory memory with instructions thereon, wherein the instructions upon execution by the processor, cause the processor to implement the method in any one of solutions A1 to A20.

A22. A computer program product stored on a non-transitory computer readable media, the computer program product including program code for carrying out the method in any one of solutions A1 to A20.

In some embodiments, the following technical solutions can be implemented:

B1. A method of video processing, comprising: performing, as part of a conversion between a current block of video and a bitstream representation of the video, a hash-based motion search; determining, based on the hash-based motion search finding a hash match and a quantization parameter (QP) of the reference frame being not larger than a QP of the current block, a rate-distortion cost of a prediction by skipping a rate-distortion cost calculation for each of one or more coding modes of the current block for the conversion; applying, based on the rate-distortion cost and a video picture comprising the current block, a prediction block for the current block; and performing, based on the prediction block, the conversion.

B2. The method of solution B1, wherein the one or more coding modes consists of an ETM_MERGE_SKIP mode, an ETM_AFFINE mode, an ETM_MERGE_TRIANGLE mode or an ETM_INTER_ME mode.

B3. The method of solution B1 or B2, wherein the one or more coding modes exclude an advanced motion vector prediction (AMVP) mode or an ETM_INTRA mode.

B4. The method of solution B1, further comprising: terminating, subsequent to the determining, finer-grained block partition checking.

B5. The method of solution B4, wherein the rate-distortion cost of an ETM_HASH_INTER mode is determined to be lower than the rate-distortion cost of any other coding mode.

B6. The method of any of solutions B1 to B5, wherein performing the hash-based motion search and the determining is based on a height or a width of the current block.

B7. The method of solution B6, wherein a size of the current block is M×N or larger.

B8. The method of solution B6, wherein a size of the current block is 64×64.

B9. The method of any of solutions B1 to B8, wherein the conversion generates the current block from the bitstream representation.

B10. The method of any of solutions B1 to B8, wherein the conversion generates the bitstream representation from the current block.

B11. An apparatus in a video system comprising a processor and a non-transitory memory with instructions thereon, wherein the instructions upon execution by the processor, cause the processor to implement the method in any one of solutions B1 to B10.

B12. A computer program product stored on a non-transitory computer readable media, the computer program product including program code for carrying out the method in any one of solutions B1 to B10.

In some embodiments, the following technical solutions can be implemented:

C1. A method of video processing, comprising: determining, for a conversion between a current block of a video and a bitstream representation of the video, motion information associated with the current block using a hash-based motion search that is based on hash values of square sub-blocks of the current block, wherein a size of the current block is M×N, and wherein M and N are positive integers; applying, based on the motion information and a video picture comprising the current block, a prediction block for the current block; and performing, based on the prediction block, the conversion.

C2. The method of solution C1, wherein M is not equal to N.

C3. The method of solution C1, wherein M is equal to N.

C4. A method of video processing, comprising: determining, for a conversion between a current block of a video and a bitstream representation of the video, motion information associated with the current block using a hash-based motion search that includes performing a K-pel integer motion vector (MV) precision check for the hash-based motion search, wherein K is a positive integer; applying, based on the motion information and a video picture comprising the current block, a prediction block for the current block; and performing, based on the prediction block, the conversion.

C5. The method of solution C4, wherein K=4.

C6. The method of any of solutions C1 to C5, wherein the size of the current block is N×N, wherein N is a positive integer less than or equal to a threshold.

C7. The method of any of solutions C1 to C5, wherein the size of the current block is M×N, wherein M and N are positive integers and M is not equal to N, and wherein M or N are less than or equal to a threshold C8. The method of solution C6 or 7, wherein the threshold is 64.

C9. The method of any of solutions C1 to C5, wherein the size of the current block is 8×4 or 4×8.

C10. The method of any of solutions C1 to C5, wherein the hash-based motion search is applied to a luma component of the video.

C11. The method of any of solutions C1 to C5, wherein the hash-based motion search is applied to a base color component of the video.

C12. The method of any of solutions C1 to C11, wherein the conversion generates the current block from the bitstream representation.

C13. The method of any of solutions C1 to C11, wherein the conversion generates the bitstream representation from the current block.

C14. An apparatus in a video system comprising a processor and a non-transitory memory with instructions thereon, wherein the instructions upon execution by the processor, cause the processor to implement the method in any one of solutions C1 to C13.

C15. A computer program product stored on a non-transitory computer readable media, the computer program product including program code for carrying out the method in any one of solutions C1 to C13.

In some embodiments, the following technical solutions can be implemented:

D1. A method for processing video, comprising: determining, by a processor, motion information regarding a first video block using a hash-based motion search, the first video block having a size of M×N, wherein M is not equal to N; and performing further processing of the first video block using the motion information.

D2. The method of solution D1, wherein M is 2N, 4N, 8N, 16N, or 32N.

D3. The method of solution D1, wherein N is 2M, 4M, 8M, 16M, or 32M.

D4. The method of solution D1, wherein determining the motion information using the hash-based motion search includes deriving hash values of non-square video blocks using hash values of square video blocks that are sub-blocks of the non-square video blocks.

D5. The method of solution D1, further comprising: determining that M is larger than N, and wherein determining the motion information using the hash-based motion search includes deriving a hash value for the first video block from M/N (N,N) video block hash values.

D6. The method of solution D1, further comprising: determining M is smaller than N, and wherein determining the motion information using the hash-based motion search includes deriving a hash value for the first video block from M/N (N,N) video block hash values.

D7. A method for processing video, comprising: determining, by a processor, motion information regarding a first video block using a hash-based motion search, the first video block having a shape that is non-rectangular and non-square; and performing further processing of the first video block using the motion information.

D8. The method of solution D7, wherein the shape is triangular.

D9. The method of solution D7, wherein the shape is a region defined by x<ky; x, y=0, 1, 2, ... M−1, wherein x and y are relative coordinates to a start point of the first video block, and wherein k is a predefined value.

D10. The method of solution D7, wherein the shape is a region defined by x>ky, x, y=0, 1, 2, ... M−1, wherein x and y are relative coordinates to a start point of the first video block, and wherein k is a predefined value.

D11. The method of solution D7, wherein the shape is defined as x<M−ky, x, y=0, 1, 2, ... M−1, wherein x and y are relative coordinates to a start point of the first video block, and wherein k is a predefined value.

D12. The method of solution D7, wherein the shape is defined as x>M−ky, x, y=0, 1, 2, ... M−1, wherein x and y are relative coordinates to a start point of the first video block, and wherein k is a predefined value.

D13. The method of solutions D1-D12, wherein the hash-based motion search is based on a fixed subset of the first video block.

D14. The method of solution D13, wherein the fixed subset is defined by a set of predefined coordinates relative to a start point of the first video block.

D15. The method of solutions D1-D14, wherein the hash-based motion search includes adding a hash-based motion vector (MV) as a starting point during a MV estimation technique.

D16. The method of solution D15, wherein the hash-based MV is checked for a best start point initialization in an integral motion estimation.

D17. The method of solutions D1-D16, further comprising: determining the hash-based motion search resulted in a hash match; determining a quantization parameter (QP) of a reference frame is larger than a QP of the first video block; and determining a rate-distortion cost of a prediction based on the determinations that the hash-based motion search resulted in the hash match and the QP of the reference frame is larger than the QP of the first video block, wherein further processing of the first video block is based on the rate-distortion cost.

D18. The method of solution D17, wherein determining the rate-distortion cost includes skipping advanced motion vector prediction (AMVP).

D19. The method of solution D17, wherein determining the rate-distortion cost includes stopping finer-grained block partition checking.

D20. The method of solution D17, wherein determining the rate-distortion cost is based on a dimension of the first video block.

D21. The method of solution D20, wherein the dimension of the first video block is larger than or equal to M×N.

D22. The method of solution D20, wherein the dimension of the first video block is 64×64 pixels.

D23. The method of solution D1, wherein a hash mode of the first video block is based on sub-square hash values, the first video block having a rectangular shape.

D24. The method of solution D1, wherein a hash mode of the first video block is based on sub-square hash values, the first video block having a square shape.

D25. The method of solutions D1 or D7, wherein the motion information includes motion vectors (MVs).

D26. The method of solutions D1 or D7, further comprising: performing a K-pel integer motion vector (MV) precision check for the hash-based motion search.

D27. The method of solution D26, wherein K is 4.

D28. The method of solutions D1-D27, wherein the first video block is a partial size of an allowed block size.

D29. The method of solutions D1-D27, wherein the first video block has a shape that is square, and the hash-based motion search is applied to N×N video blocks, wherein N is smaller than or equal to a threshold.

D30. The method of solution D29, wherein the threshold is 64.

D31. The method of solutions D1-D27, wherein the first video block has a shape that is rectangular, and the hash-based motion search is applied to M×N video blocks, wherein M*N is smaller than or equal to a threshold.

D32. The method of solution D31, wherein the threshold is 64.

D33. The method of solutions D1-D27, wherein the first video block is 4×8 or 8×4.

D34. The method of solutions D1-D27, wherein the hash-based motion search is applied to a color component.

D35. The method of solutions D1-D16, further comprising: determining the hash-based motion search resulted in a hash match; determining a quantization parameter (QP) of a reference frame is not larger than a QP of the first video block; and determining a rate-distortion cost of a prediction by skipping rate-distortion cost calculations for some modes based on the determinations that the hash-based motion search resulted in the hash match and the QP of the reference frame is larger than the QP of the first video block, wherein further processing of the first video block is based on the rate-distortion cost.

D36. The method of solution D35, wherein the skipping comprises skipping rate-distortion cost calculations for an affine mode, a triangular mode or an adaptive motion vector resolution (AMVR) mode.

D37. The method of solution D35, wherein determining the rate-distortion cost includes stopping finer-grained block partition checking.

D38. A video decoding apparatus comprising a processor configured to implement a method recited in one or more of solutions D1 to D37.

D39. A video encoding apparatus comprising a processor configured to implement a method recited in one or more of solutions D1 to D37.

D40. A computer program product having computer code stored thereon, the code, when executed by a processor, causes the processor to implement a method recited in any of solutions D1 to D37.

Figure 10:
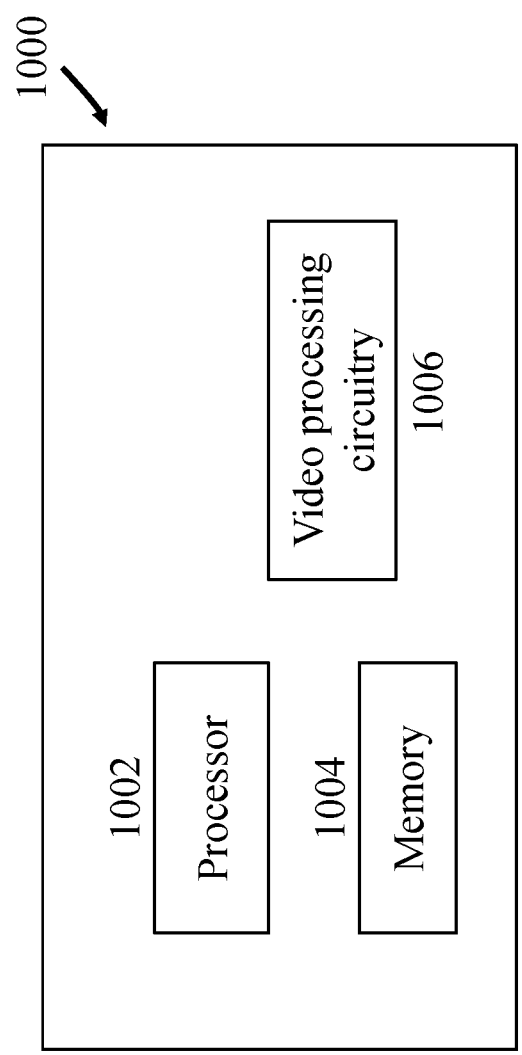
FIG. 10 is a block diagram of an example of a hardware platform for implementing a visual media decoding or a visual media encoding technique described in the present document.

FIG. 10 is a block diagram of a video processing apparatus 1000. The apparatus 1000 may be used to implement one or more of the methods described herein. The apparatus 1000 may be embodied in a smartphone, tablet, computer, Internet of Things (IoT) receiver, and so on. The apparatus 1000 may include one or more processors 1002, one or more memories 1004 and video processing hardware 1006. The processor(s) 1002 may be configured to implement one or more methods described in the present document. The memory (memories) 1004 may be used for storing data and code used for implementing the methods and techniques described herein. The video processing hardware 1006 may be used to implement, in hardware circuitry, some techniques described in the present document.

In some embodiments, the video coding methods may be implemented using an apparatus that is implemented on a hardware platform as described with respect to FIG. 10.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

Figure 11:
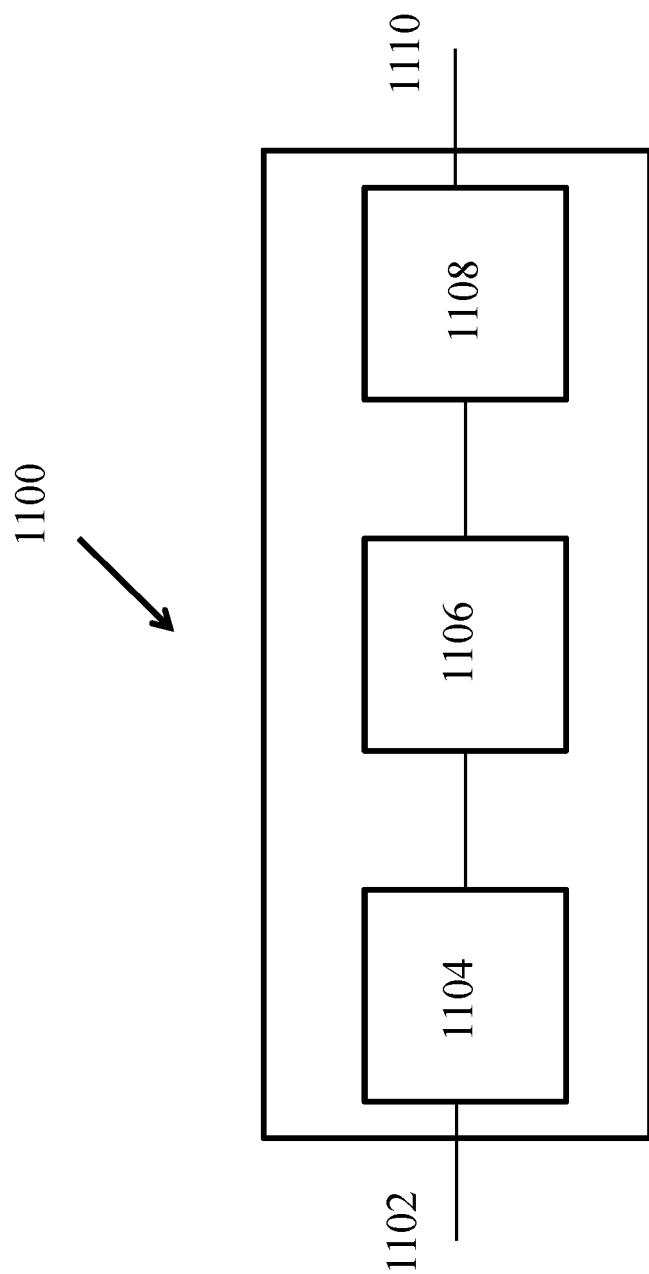
FIG. 11 is a block diagram of an example video processing system in which disclosed techniques may be implemented.

FIG. 11 is a block diagram showing an example video processing system 1100 in which various techniques disclosed herein may be implemented. Various implementations may include some or all of the components of the system 1100. The system 1100 may include input 1102 for receiving video content. The video content may be received in a raw or uncompressed format, e.g., 8 or 10 bit multi-component pixel values, or may be in a compressed or encoded format. The input 1102 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1100 may include a coding component 1104 that may implement the various coding or encoding methods described in the present document. The coding component 1104 may reduce the average bitrate of video from the input 1102 to the output of the coding component 1104 to produce a coded representation of the video. The coding techniques are therefore sometimes called video compression or video transcoding techniques. The output of the coding component 1104 may be either stored, or transmitted via a communication connected, as represented by the component 1106. The stored or communicated bitstream (or coded) representation of the video received at the input 1102 may be used by the component 1108 for generating pixel values or displayable video that is sent to a display interface 1110. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
performing, as part of a conversion between a current block of video and a bitstream of the video, a hash-based motion search;
determining, based on the hash-based motion search finding a hash match and a quantization parameter (QP) of a reference frame being not larger than a QP of the current block, a rate-distortion cost of a prediction by skipping a rate-distortion cost calculation for each of one or more coding modes of the current block for the conversion;
terminating, subsequent to the determining, finer-grained block partition checking;
applying, based on the rate-distortion cost and a video picture comprising the current block, the prediction for the current block; and
performing, based on the prediction, the conversion,
wherein the one or more coding modes consists of a MERGE_SKIP mode, an AFFINE mode, a MERGE_TRIANGLE mode, or an INTER_ME mode, and
wherein the one or more coding modes exclude an advanced motion vector prediction (AMVP) mode and an INTRA mode.

2. The method of claim 1, wherein the rate-distortion cost of a HASH_INTER mode is determined to be lower than the rate-distortion cost of any other coding mode.

3. The method of claim 1, wherein performing the hash-based motion search and the determining is based on a height or a width of the current block.

4. The method of claim 3, wherein a size of the current block is M×N or larger.

5. The method of claim 3, wherein a size of the current block is 64×64.

6. The method of claim 1, wherein the conversion includes encoding the current block into the bitstream.

7. The method of claim 1, wherein the conversion includes decoding the current block from the bitstream.

8. The method of claim 1, wherein, when the current block is rectangular, the method further comprises:
determining, using the hash-based motion search based on hash values of square sub-blocks of the current block, motion information associated with the current block.

9. An apparatus for processing video data comprising a processor and a non-transitory memory with instructions thereon, wherein the instructions upon execution by the processor, cause the processor to:
perform, as part of a conversion between a current block of video and a bitstream of the video, a hash-based motion search;
determine, based on the hash-based motion search finding a hash match and a quantization parameter (QP) of a reference frame being not larger than a QP of the current block, a rate-distortion cost of a prediction by skipping a rate-distortion cost calculation for each of one or more coding modes of the current block for the conversion;
terminate, subsequent to determining the rate-distortion cost, finer-grained block partition checking;
apply, based on the rate-distortion cost and a video picture comprising the current block, the prediction for the current block; and
perform, based on the prediction, the conversion,
wherein the one or more coding modes consists of a MERGE_SKIP mode, an AFFINE mode, a MERGE_TRIANGLE mode, or an INTER_ME mode, and
wherein the one or more coding modes exclude an advanced motion vector prediction (AMVP) mode or an INTRA mode.

10. The apparatus of claim 9, wherein the rate-distortion cost of a HASH_INTER mode is determined to be lower than the rate-distortion cost of any other coding mode.

11. The apparatus of claim 9, wherein performing the hash-based motion search and the determining is based on a height or a width of the current block.

12. The apparatus of claim 11, wherein a size of the current block is M×N or larger.

13. The apparatus of claim 11, wherein a size of the current block is 64×64.

14. The apparatus of claim 9, wherein the conversion includes encoding the current block into the bitstream.

15. The apparatus of claim 9, wherein the conversion includes decoding the current block from the bitstream.

16. The apparatus of claim 9, wherein, when the current block is rectangular, the instructions upon execution by the processor, further cause the processor to:
determine, using the hash-based motion search based on hash values of square sub-blocks of the current block, motion information associated with the current block.

17. A non-transitory computer-readable recording medium storing a bitstream of a video which is generated by a method performed by a video processing apparatus, wherein the method comprises:
performing, as part of a conversion between a current block of the video and a bitstream of the video, a hash-based motion search;
determining, based on the hash-based motion search finding a hash match and a quantization parameter (QP) of a reference frame being not larger than a QP of the current block, a rate-distortion cost of a prediction by skipping a rate-distortion calculation for each of one or more coding modes of the current block for the conversion;
terminating, subsequent to the determining, finer-grained block partition checking;
applying, based on the rate-distortion cost and a video picture comprising the current block, the prediction for the current block; and
generating, based on the prediction, the bitstream,
wherein the one or more coding modes consists of a MERGE_SKIP mode, an AFFINE mode, a MERGE_TRIANGLE mode, or an INTER_ME mode, and
wherein the one or more coding modes exclude an advanced motion vector prediction (AMVP) mode or an INTRA mode.

18. The non-transitory computer-readable recording medium of claim 17, wherein the rate-distortion cost of a HASH_INTER mode is determined to be lower than the rate-distortion cost of any other coding mode.

19. The non-transitory computer-readable recording medium of claim 17, wherein performing the hash-based motion search and the determining is based on a height or a width of the current block.

20. The non-transitory computer-readable recording medium of claim 19, wherein a size of the current block is M×N or larger.

21. The non-transitory computer-readable recording medium of claim 19, wherein a size of the current block is 64×64.

* * * * *